United States Patent [19]
Schultz et al.

[11] Patent Number: 5,718,949
[45] Date of Patent: Feb. 17, 1998

[54] DIAMOND-LIKE CARBON ENCAPSULATION OF MAGNETIC HEADS

[75] Inventors: Allan E. Schultz, St. Paul; L. Vincent Ruscello; William H. Nunne, both of Burnsville, all of Minn.

[73] Assignee: Seagate Technology, Inc., Scotts Valley, Calif.

[21] Appl. No.: 722,910

[22] Filed: Sep. 27, 1996

Related U.S. Application Data

[62] Division of Ser. No. 587,270, Jan. 17, 1996, Pat. No. 5,640,292.
[51] Int. Cl.$^6$ .................... C23C 16/26; G11B 5/127
[52] U.S. Cl. .................... 427/249; 427/122; 427/402; 216/41
[58] Field of Search .................... 427/249, 122, 427/402; 216/41; 360/125, 122

[56] References Cited

U.S. PATENT DOCUMENTS

| | | | |
|---|---|---|---|
| 4,052,749 | 10/1977 | Nomura et al. | 360/123 |
| 5,159,508 | 10/1992 | Grill et al. | 360/103 |
| 5,363,265 | 11/1994 | Hsie et al. | 360/113 |
| 5,406,695 | 4/1995 | Amemori | 360/122 X |
| 5,541,793 | 7/1996 | Schwarz | 360/121 |
| 5,563,754 | 10/1996 | Gray et al. | 360/126 |
| 5,609,948 | 3/1997 | David et al. | 428/216 |

FOREIGN PATENT DOCUMENTS

| | | |
|---|---|---|
| 0 493 902 A3 | 7/1992 | European Pat. Off. |
| 0 584 707 A2 | 3/1994 | European Pat. Off. |
| 2 064 849 | 6/1981 | United Kingdom . |
| WO 95/18442 | 7/1995 | WIPO . |

OTHER PUBLICATIONS

Patent Abstracts of Japan, vol. 9, No. 79 (P-347) (1802) 9 Apr. 185 & JP,A,59 210 520 (Yukio Ichinose) 29 Nov. 1984.
Patent Abstracts of Japan, vol. 11, No. 22 (P-594) 9 Jul. 1987 & JP,A,62 033 317 (Matsushita Electric Ind Co Ltd) 13 Feb. 1987.
Patent Abstracts of Japan, vol. 16, No. 430 (P-1417) 9 Sep. 1992 & JP,A,04 147 411 (Mitsubishi Electric Corp) 20 May 1992.
Patent Abstracts of Japan, vol. 13, No. 167 (P-861) 20 Apr. 1989 & JP,A,1 004 913 (NEC Kansai Ltd) 10 Jan. 1989.
Patent Abstracts of Japan, vol. 11, No. 91 (P-558) (2538) 23 Mar. 1987 & JP,A,61 242 313 (Hitachi Ltd) 28 Oct. 1986.
Patent Abstracts of Japan, vol. 11, No. 49 (P-547) 14 Feb. 1987 & JP,A,61 216 109 (Matsushita Electric Ind Co Ltd) 25 Sep. 1986.
IBM Technical Disclosure Bulletin, vol. 31, No. 12, May 1989, Armonk, N.Y., US, pp. 317–318. "Low Stress Dielectric Coatings for Copper Parts".
IBM Technical Disclosure Bulletin, vol. 34, No. 2, Jul. 1991, Armonk, N.Y., US, pp. 19–20 "Thermal Ink Jet Heater Devices Incorporating Diamond–Like Carbon Films As Protective Overcoats".

*Primary Examiner*—Roy V. King
*Attorney, Agent, or Firm*—Kinney & Lange, P.A.

[57] ABSTRACT

A thin film magnetic transducer supported on a substrate includes a coil that terminates at pads supported on the substrate. A layer of diamond-like carbon material encapsulates the head, substrate and coil, but not the pads. A thin layer of diamond-like carbon is deposited over the exposed portions of the transducer, coil and substrate. Three techniques are described for exposing the pads including employing a photoresist mask, depositing an adhesive layer of silicon over the conductive paths but not the pads, and using a photoresist mask to etch the diamond-like carbon layer over the pads and breaking down the silicon adhesive layer with a design voltage.

9 Claims, 3 Drawing Sheets

DIAMOND-LIKE CARBON ENCAPSULATION OF MAGNETIC HEADS

This is a divisional of application Ser. No. 08/587,270, filed Jan. 17, 1996, now U.S. Pat. No. 5,640,292.

BACKGROUND OF THE INVENTION

This invention relates to encapsulation of magnetic heads, and particularly to a process for encapsulating magnetic heads with diamond-like carbon, as well as the resulting structure.

Thin film magnetic transducing heads employ a pair of magnetic poles separated, at the air-bearing surface, by a thin film of insulating material. In inductive transducers, the body of the transducing head employs a plurality of coil segments passing therethrough, also embedded in insulating material. Thus in a write head, current passing through the coil induces changes in the magnetic field in the poles, causing magnetic flux adjacent the gap, thereby altering the magnetic domains in an adjacent magnetic disc. In an inductive read head, changes in the magnetic flux adjacent the gap due to the rotating magnetic disc induce changes in the magnetic field in the poles, which in turn induces or alters an electric signal in the coils. Typically, the head is mounted to a substrate, with the several convolutions of the coil terminating in at least a pair of electrical pads for connection to the read/write circuits of the disc drive. The substrate is mounted on an actuator arm for positioning adjacent the rotating magnetic disc.

It is common to encapsulate thin film inductive magnetic heads to protect them from the corrosive effects of water and other contaminates during subsequent processing of the head or during use. For example, wet etchants, solvents and developing agents used in subsequent processing of the head can attack the head. Therefore, it is common to encapsulate the head as early as possible and prior to subsequent processing. Prior encapsulation materials included oxide insulators such as $SiO_2$ and $Al_2O_3$. The difficulty with such insulating material is that pinholes formed in the material allowing entrance of contaminates, etchants and developing agents. Even with encapsulation layers that are quite thick, such as several thousand Angstroms, a risk exists that contaminates, etchants and developing agents will penetrate the encapsulation layer and attack the head.

There is, accordingly, a need for an encapsulation technique for a thin film head that is not susceptible to the etchants ordinarily employed in the formation of the head.

SUMMARY OF THE INVENTION

The present invention is directed to a thin film magnetic transducer supported on a substrate in which the coil terminates with at least two terminal pads supported on the substrate. A layer of diamond-like carbon material encapsulates the head, substrate and coil, but not the pads.

According to the present invention, the magnetic transducer and substrate are encapsulated by depositing a thin layer of diamond-like carbon over the exposed portions of the transducer, coil and substrate, but not the pads.

In one form of the invention, the pads are exposed through use of a photoresist mask covering at least the pads but not the transducer, and the diamond-like carbon is deposited over the exposed portions of the transducer, substrate, coil and photoresist. Diamond-like carbon over the pads is removed with the photoresist.

In another form of the invention, the film of adhesive material extends over the pads, and the diamond-like material is applied to all exposed portions. A photoresist is applied to the diamond-like material and is patterned to expose selected portions of the diamond-like carbon layer over the pads. The diamond-like carbon is removed to expose the adhesive material over the pads. The photoresist is then removed leaving the encapsulated transducer. The adhesive material is of a type and thickness as to break down upon application of a design voltage.

In one form of the invention, the adhesive material is silicon that oxidizes to form a thin layer of $SiO_2$ having a thickness of about 20 Angstroms. Preferably, the pads are constructed of copper or gold and the diamond-like carbon is etched by application of anisotropic oxygen etchant.

DETAILED DESCRIPTION OF THE PREFERRED EMBODIMENTS

Figure 1:
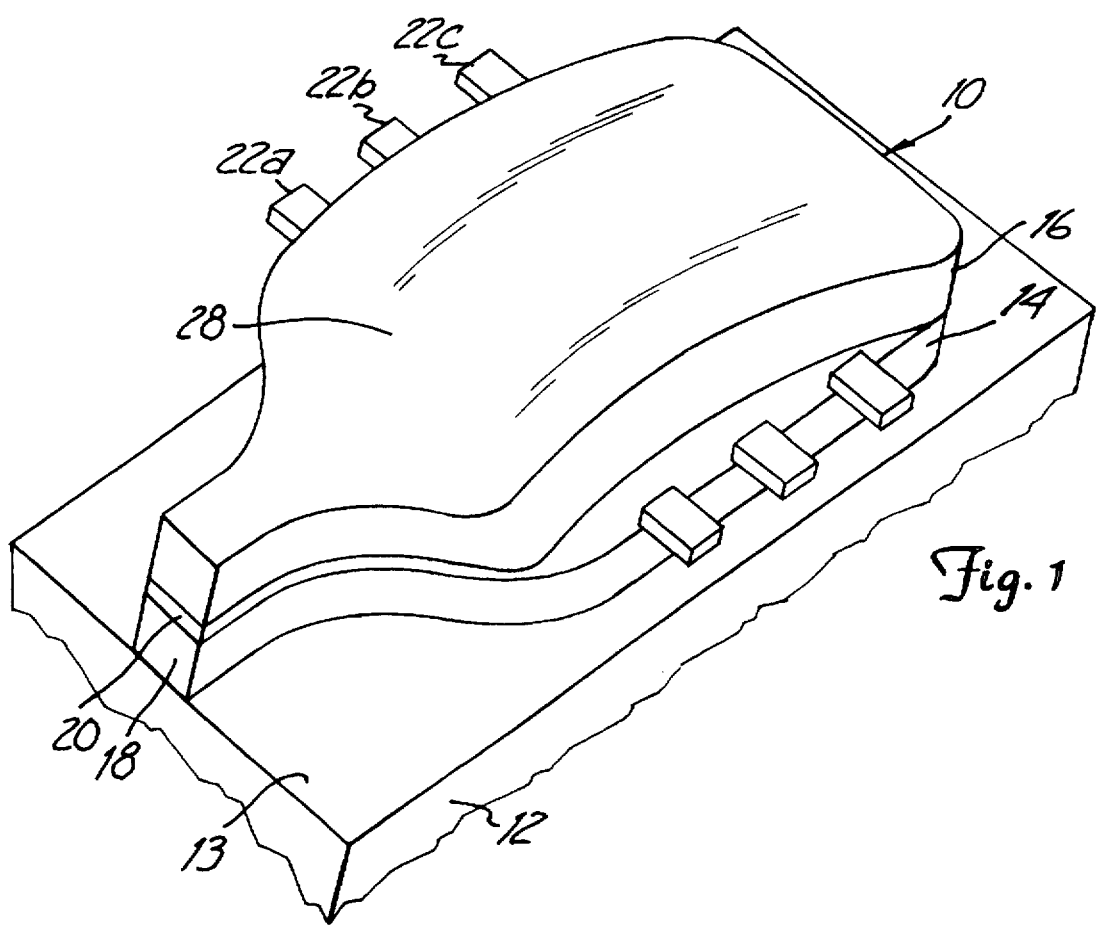
FIG. 1 is a perspective view of a thin film head for encapsulation in accordance with the present invention.
Figure 2:
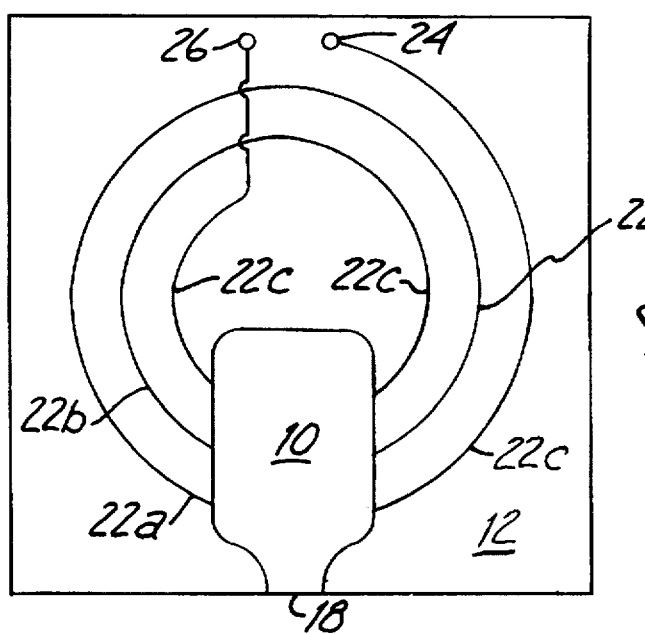
FIG. 2 is a top view of a thin film head and coil supported by a substrate.
Figure 3:
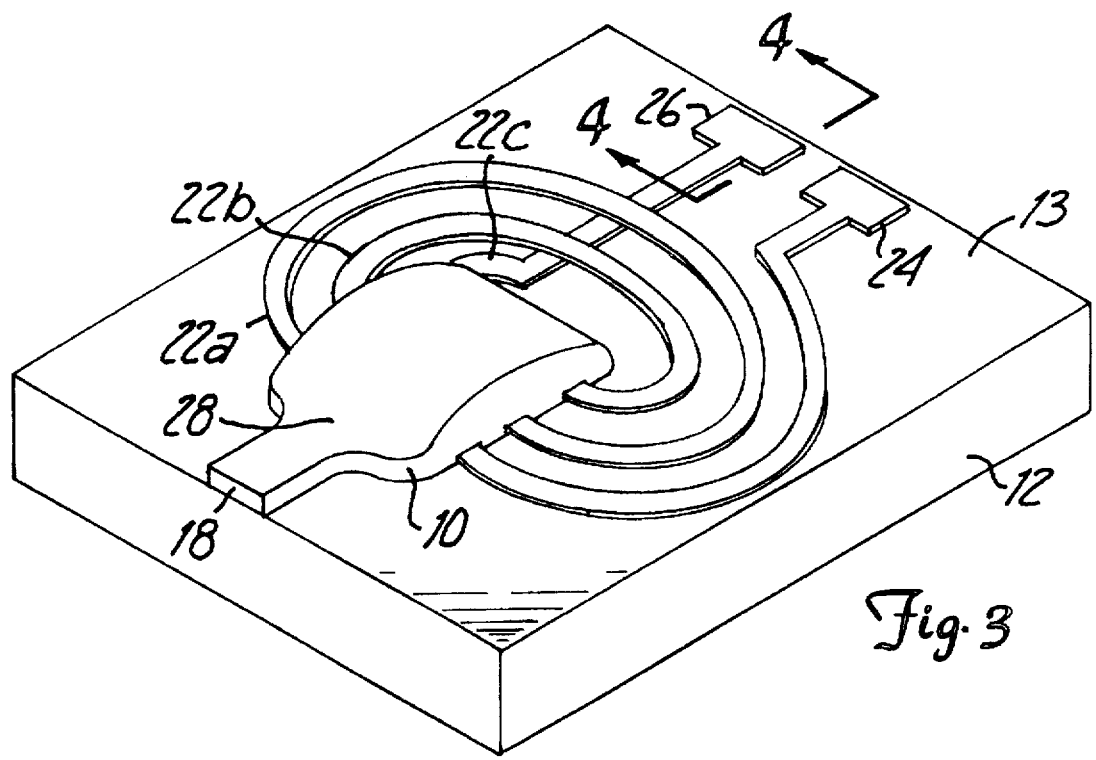
FIG. 3 is a perspective view, as in FIG. 1, of a thin head and coil on a substrate for purposes of illustrating specific details of the present invention.

FIG. 1 is a perspective view of a thin film head 10 supported by substrate 12. Head 10 includes a bottom pole 14 and a top pole 16 constructed of magnetic material such as a nickel-iron Permalloy or the like. At the air-bearing surface 18, poles 14 and 16 are separated by a thin layer 20 of insulating gap material such as silicon dioxide or aluminum oxide. A plurality of thin film conductors 22a, 22b, and 22c pass between poles 14 and 16 and are insulated from the poles and each other by a continuation of the insulation layer 20. In the region of head 10 distal from air-bearing surface 18, poles 14 and 16 are in direct contact, thereby forming the "back gap" of the head. As shown particularly in FIGS. 2 and 3, coil portions 22a and 22c terminate at pads 24 and 26 supported by substrate 12.

(It will be appreciated by those skilled in the art that FIG. 1 is a simplified version of a thin film head, and that numerous layers are employed in the formation of various aspects of the head. For more details of a thin film head of the character shown in FIG. 1, reference may be made to U.S. application Ser. No. 08/331,684 filed Oct. 31, 1994 for "Thin Film Head Design Improving Top Pole Width Control" by Stageberg et al. and assigned to the same assignee as the present invention. The Stageberg et al. application is herein incorporated by reference.)

As described in the Stageberg et al. application, "hill" region 28 is formed by the greater thickness of head 10 due to the presence of coil portions 22 and the insulation surrounding them. As a result, the top surface of pole 16 slopes between a relatively thick portion at the region of coil 22, to a relatively thin portion of head 10 at the air-bearing surface 18, thereby forming the hill region 28. Top pole 16 is typically shaped by ion milling process where a photoresist mask on the pole is patterned to the desired shape of the pole, and the mask and excess magnetic material are simultaneously ion milled to remove unwanted magnetic material. Typically, the photoresist is "spin-coated" onto pole 16. The presence of hill region 28 causes the spin-coated photoresist mask to be thinner at the hill than at in other regions. Excess magnetic material may be milled away at the hill, due to the thinner mask resulting in a weaker structure at the mask and raising the likelihood of delamination during subsequent steps. (The Stageberg et al. application overcomes some of these problems by creating thicker layers of photoresist in the region of the hill.) However, delamination of the layers of the head can still occur in the region of the hill, as well as elsewhere, without encapsulation of the head. Delamination occurs because various wet etchants employed in subsequent processing of the head penetrated the head. Prior encapsulation techniques have not been altogether successful to protect the head from etchants and developing agents, largely because pinholes in the encapsulation material did not adequately protect the head. Moreover, prior encapsulation materials absorb water, causing delamination of even encapsulated heads.

The present invention is directed to the use of a diamond-like carbon encapsulation of head 10 and substrate 12. More particularly, the present invention contemplates the deposition of a thin coat of approximately 500 to 1000 Angstroms of diamond-like carbon over head 10, coils 22 and the upper surface 13 of substrate 12, but not pads 24 and 26. This layer of diamond-like carbon material is illustrated in greater detail in FIGS. 4–7. The diamond-like carbon encapsulation is applied after the pole tips are trimmed and protects the head from attack by etchants and developing agents employed in subsequent processing.

Diamond-like carbon is commercially known as "DLC" and is commercially available from a variety of sources. The diamond-like carbon is similar to diamond in physical properties. The material is a hydrogenated carbon typically having a hydrogen content between about 30 to 50 percent and a large fraction of $sp^3$ carbon-carbon bonds rather than $sp^2$ found in ordinary graphite. The material is typically formed from a hydrogenated carbon feedstock, such as methane ($CH_4$), processed by any of a variety of processes, such as an ion beam deposition process. It is theorized that during formation of diamond-like carbon, hydrogen is removed from the feedstock material forming a network of $sp^3$ bonded carbon atoms, rather than an ordered array of $sp^2$ bonded carbon, i.e. graphite. The material resembles a hard, highly cross-linked polymer and exhibits a higher thermal conductivity than common electrical insulating material (such as $SiO_2$ or $Al_2O_3$) and a high electrical resistivity, of the order of about $10^{10}$ Ω-cm. Diamond-like carbon films are similar to diamonds in that they exhibit very high hardness ranges (1,000 to 5,000 on the Vickers hardness scale), a low coefficient of friction (of the order of less than 0.1) and densities between about 1.7 and 2.2. The material is commercially referred to as "diamond-like" because of its similarity in characteristics to natural and synthetic diamond. Moreover, like natural and synthetic diamond, the diamond-like carbon exhibits a high resistivity.

Diamond-like carbon layer 30 is preferably formed by an ion beam deposition process onto the exposed portions of the head and substrate, including on the sidewalls. The simplicity of the ion beam process permits the formation of low defect encapsulation films at very low thicknesses typical for sidewalls. The pin holes present in $SiO_2$ and $Al_2O_3$ are not present in diamond-like carbon, so even the thin (500 Angstroms) encapsulation layer of diamond-like material does not absorb water that may delaminate the head. Other deposition processes are also feasible, including radio frequency and direct current magnetron sputtering, carbon-arc deposition, laser abolition, and plasma enhanced chemical vapor deposition (PECVD), to name a few.

Diamond-like carbon encapsulation layer 30 provides a good electrical insulator for the head. Moreover, the diamond-like carbon encapsulation layer is not susceptible to attack by the etchants, solvents and developers ordinarily used in subsequent processing of the head. Thus, etchants, solvents and developers used in shaping Ni—Fe magnetic Films and insulators such as $SiO_2$ and $Al_2O_3$ do not attack the diamond-like carbon encapsulation layer. As a result, the head is less susceptible of corrosive attack during subsequent processing.

Figure 5:
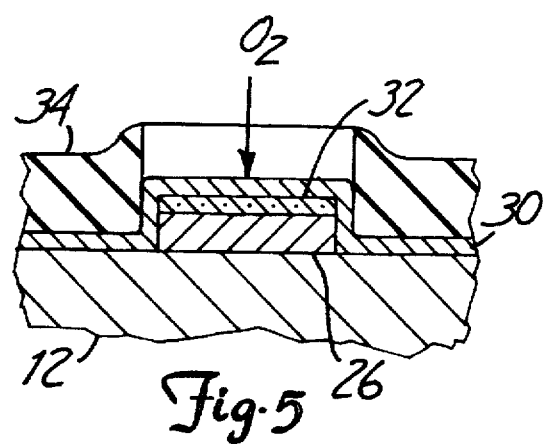
Figure 6:
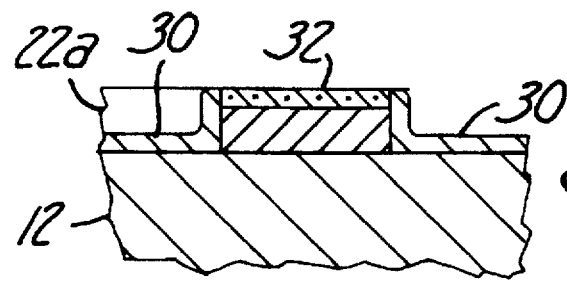

One problem arises in applying diamond-like carbon as an encapsulation in that to the extent it also covers pads 24 and 26, the diamond-like carbon forms insulation barrier over the pads and is not easily penetratable. Thus, while its insulation and hardness properties are beneficial as an encapsulation material, it also insulates the pads 24 and 26 from connection to an external circuit. One solution to this problem is to mask the pads and any portion of the coils not desired to be encapsulated, with a layer of photoresist patterned to expose the transducer and other portions of the structure desired to be encapsulated. The diamond-like carbon layer is then deposited over exposed portions of the transducer, substrate, coil and photoresist. The photoresist is then exposed and dissolved, carrying away the diamond-like material from at least the pads. Another solution is illustrated in FIGS. 4–6.

Figure 4:
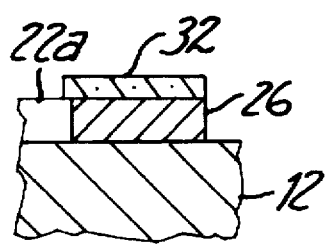
FIGS. 4, 5, and 6 are section views taken along line 4—4 in FIG. 3 illustrating the steps of the process of encapsulating the transducer and exposing the termination pads in accordance with the present invention.

As shown in FIG. 4, coil portion 22a terminates at gold or copper pad 26 on substrate 12. A thin layer 32 of silicon is applied over the exposed surfaces of the paths, and optionally over pads 24 and 26. Preferably, the silicon layer has a thickness of about 20 Angstroms. As shown in FIG. 5, the diamond-like carbon layer 30 is deposited over the surface 13 of substrate 12, the head 10 coils 22 and exposed surface of silicon layer 32. A layer of photoresist 34 is applied over the entire diamond-like carbon layer 30 and patterned to expose the diamond-like carbon layer above pads 24 and 26. An anisotropic oxygen etchant is applied to the exposed diamond-like carbon over the silicon protective layer to remove the exposed diamond-like carbon and expose the silicon layer over pads 26. As shown in FIG. 6, the photoresist is then exposed and washed away, leaving the entire head, including the upper surface 13 of substrate 12 and the coils encapsulated in the 500+Angstrom layer of diamond-like carbon. There remains, however, a thin (20 Angstrom) layer of silicon over pads 24 and 26 which has been oxidized during the processing to form silicon dioxide ($SiO_2$). However, layer 32 of $SiO_2$ breaks down when the design power of the head is applied to pads 24 and 26, thereby removing the insulating properties of layer 32. For example the 20 Angstrom layer of $SiO_2$ will break down upon application of a DC voltage of about 3.0 volts at 10 milliamps. Conveniently, the design voltage to break down the $SiO_2$ material is no greater than the operating voltage of the head, so the $SiO_2$ layer can be broken down upon first use of the head.

Figure 7:
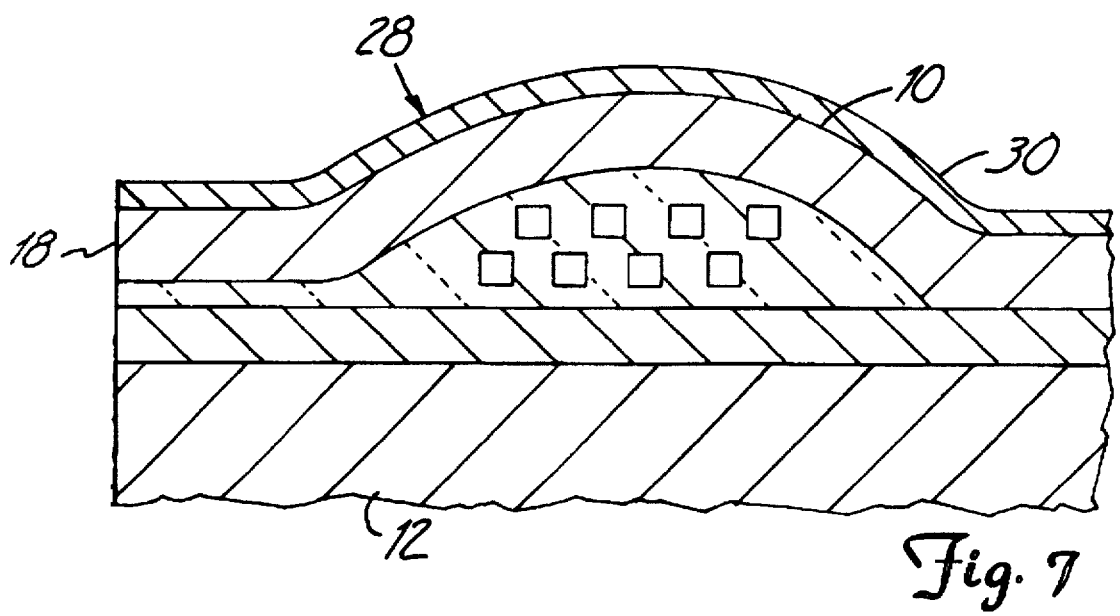
FIG. 7 is a section view of an encapsulated transducer in accordance with the present invention.

As shown in FIG. 7, layer 30 of diamond-like carbon encapsulates the entire head 10, including the hill region 28. This effectively protects the head from contamination during subsequent processing in the final formation of the magnetic head. Because diamond-like carbon is a hard material, as well as an electrical insulator, the material should not be deposited onto pads 24 and 26, or if the material is deposited onto the pads, it should be etched away from the pads.

Although the present invention has been described with reference to preferred embodiments, workers skilled in the art will recognize that changes may be made in form and detail without departing from the spirit and scope of the invention.

What is claimed is:

1. A process for encapsulating a thin-film magnetic head having a substrate, a transducing element supported by the substrate, at least one coil at least partially supported by the substrate outside the transducing element and operatively connected with the transducing element to carry electric signals, and at least two terminal pads supported by the substrate outside the transducing element and terminating respective ends of the coil, the transducing element having a predetermined operating voltage, the process comprising;

depositing a layer of thermally conductive, high electrical resistivity diamond-like carbon over the transducing element, the terminal pads and at least a portion of the substrate and the coil outside the transducing element; and exposing a surface of the pads.

2. The process of claim 1 including depositing a layer of adhesive material over the coils before depositing the layer of diamond-like carbon.

3. The process of claim 2 wherein the step of depositing the layer of adhesive material includes depositing the adhesive material over the pads, and the step of exposing of the surface of the pads comprises:

forming a photoresist over the layer of diamond-like carbon;

patterning the photoresist to expose selected portions of the layer of diamond-like carbon over the pads;

removing the exposed portions of the layer of diamond-like carbon over the pads; and removing the remaining photoresist.

4. The process of claim 3 wherein the material and thickness of the adhesive material is selected to break down upon application of a design voltage, and the step of removing exposed portions of the layer of diamond-like carbon exposes at least portions of the layer of adhesive material over each pad.

5. The process of claim 4 wherein the layer of adhesive material comprises a layer of silicon having a thickness of about 20 Angstroms.

6. The process of claim 5 wherein the exposed portions of the layer of diamond-like carbon are removed by applying an anisotropic oxygen etchant to the exposed portions of the diamond-like carbon.

7. The process of claim 4 wherein the exposed portions of the layer of diamond-like carbon are removed by applying an anisotropic oxygen etchant to the exposed portions of the diamond-like carbon.

8. The process of claim 3 wherein the exposed portions of the layer of diamond-like carbon are removed by applying an anisotropic oxygen etchant to the exposed portions of the diamond-like carbon.

9. A process for encapsulating a thin-film magnetic head having a substrate, a transducing element supported by the substrate, at least one coil at least partially supported by the substrate outside the transducing element and operatively connected with the transducing element to carry electric signals, and at least two terminal pads supported by the substrate outside the transducing element and terminating respective ends of the coil, the transducing element having a predetermined operating voltage, the process comprising:

forming a photoresist over the transducing element and the substrate, the coil and the pads outside the transducing element, and patterning the photoresist to expose at least the transducing element but not expose the pads, depositing a layer of diamond-like carbon over the transducing element and the photoresist and any portions of the substrate and the coil that were exposed by the step of patterning the photoresist, and exposing a surface of the pads by removing the photoresist and the diamond-like carbon deposited over the photoresist.

* * * * *

UNITED STATES PATENT AND TRADEMARK OFFICE
CERTIFICATE OF CORRECTION

PATENT NO. : 5,718,949
DATED : February 17, 1998
INVENTOR(S) : ALLAN E. SCHULTZ, L. VINCENT RUSCELLO, WILLIAM H. NUNNE It is certified that error appears in the above-indentified patent and that said Letters Patent is hereby corrected as shown below:

Column 2, line 48, after "the" delete "an" and insert --art--

Signed and Sealed this

Twenty-ninth Day of September, 1998

Attest:

BRUCE LEHMAN

Attesting Officer

Commissioner of Patents and Trademarks